(12) United States Patent
Miyashiro et al.

(10) Patent No.: US 12,497,132 B2
(45) Date of Patent: Dec. 16, 2025

(54) LEANING VEHICLE

(71) Applicant: YAMAHA HATSUDOKI KABUSHIKI KAISHA, Iwata (JP)

(72) Inventors: Shidehiko Miyashiro, Shizuoka (JP); Katsutoshi Satoh, Shizuoka (JP); Takehisa Katsura, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 545 days.

(21) Appl. No.: 17/981,261

(22) Filed: Nov. 4, 2022

(65) Prior Publication Data
US 2023/0303210 A1 Sep. 28, 2023

(30) Foreign Application Priority Data

Mar. 25, 2022 (JP) .................. 2022-050159

(51) Int. Cl.
*B62M 7/06* (2006.01)
*B62K 11/04* (2006.01)

(52) U.S. Cl.
CPC .............. *B62M 7/06* (2013.01); *B62K 11/04* (2013.01)

(58) Field of Classification Search
CPC ....................................................... B62M 7/06
See application file for complete search history.

(56) References Cited

U.S. PATENT DOCUMENTS 4,407,383 A * 10/1983 Enokimoto .......... B62D 21/183
180/908

FOREIGN PATENT DOCUMENTS

| CN | 216002919 U | * | 3/2022 |
| EP | 2860093 A1 | | 4/2015 |
| JP | 2013091399 A | * | 5/2013 |
| JP | 2015074352 A | | 4/2015 |

* cited by examiner

*Primary Examiner* — Vicky A Johnson
(74) *Attorney, Agent, or Firm* — Rabin & Berdo, P.C.

(57) ABSTRACT

A leaning vehicle including a body frame that has a head pipe and a frame member extending rearward from the head pipe, a suspension plate attached to the frame member, and a drive source attached to the suspension plate. The suspension plate includes a first plate and a second plate stacked together in a left-right direction of the leaning vehicle. A dimension of the first plate in a the left-right direction is smaller than a dimension thereof in a front-rear direction of the leaning vehicle and a dimension thereof in an up-down direction of the leaning vehicle. A dimension of the second plate in the left-right direction is smaller than a dimension thereof in the front-rear direction and a dimension thereof in the up-down direction. The first plate and the second plate are in slidable contact with each other.

9 Claims, 8 Drawing Sheets

LEANING VEHICLE

CROSS-REFERENCE TO RELATED APPLICATIONS

This application claims the benefit of priority to Japanese Patent Application No. 2022-50159 filed on Mar. 25, 2022, the entire contents of which are hereby incorporated herein by reference.

BACKGROUND OF THE INVENTION

Field of the Invention

The present invention relates to a leaning vehicle.

Description of the Related Art

Leaning vehicles have been known in the art, which include a drive source that generates the driving force for traveling, and a vehicle body frame that supports the drive source. A leaning vehicle refers to a vehicle of which the vehicle body is leaned when turning left or right. For example, JP2015-74352A describes a motorcycle including a vehicle body frame, and an internal combustion engine (hereinafter referred to as an "engine") supported on the vehicle body frame. In the motorcycle described in JP2015-74352A, suspension plates are fixed to the vehicle body frame, and the engine is fixed to the suspension plates by bolts.

Now, an engine is a heavy object. In order to stably support an engine, it is preferred to securely fix the engine to the vehicle body frame. When the engine is securely fixed to the vehicle body frame, the integrity between the vehicle body frame and the engine increases. On the other hand, since a leaning vehicle such as a motorcycle is a vehicle that is straddled by the rider, the behavior of the vehicle body frame has a significant impact on the riding feel. When the integrity between the vehicle body frame and the engine is very high, it is not always possible to obtain a good riding feel.

SUMMARY OF THE INVENTION

The present invention has been made in view of the above, and an object thereof is to provide a leaning vehicle in which the drive source is stably supported on the vehicle body frame and a good riding feel is obtained.

When a leaning vehicle rapidly accelerates or rapidly decelerates, the vehicle body frame receives a rearward or forward force from the drive source due to the inertia of the drive source. With a leaning vehicle, the vehicle body frame tends to move relatively significantly upward or downward due to the unevenness of the road surface, etc. When the vehicle body frame moves upward or downward, the vehicle body frame receives a downward or upward force from the drive source due to the inertia of the drive source. Therefore, the suspension plates connecting together the vehicle body frame and the drive source are required to have a high rigidity in the pitch direction.

On the other hand, when a leaning vehicle turns left or right, the vehicle body frame tilts leftward or rightward. Then, when the leaning vehicle travels straight, the vehicle body frame returns from the tilted position to the upright position. During such cornering, the vehicle body frame receives a leftward or rightward force from the drive source due to the inertia of the drive source. However, if the integrity between the vehicle body frame and the drive source is too high, the riding feel during cornering tends to decrease. As a result of our in-depth study, the inventor has made such findings and arrived at the invention defined below.

A leaning vehicle disclosed herein includes a vehicle body frame including a head pipe and a frame member extending rearward from the head pipe. The leaning vehicle includes: a suspension plate attached to the frame member; and a drive source attached to the suspension plate. The suspension plate includes a first plate and a second plate stacked together in a left-right direction, wherein a dimension of the first plate in a vehicle left-right direction is smaller than a dimension thereof in a vehicle front-rear direction and a dimension thereof in a vehicle up-down direction, and a dimension of the second plate in the vehicle left-right direction is smaller than a dimension thereof in the vehicle front-rear direction and a dimension thereof in the vehicle up-down direction. The first plate and the second plate are in slidable contact with each other.

With the leaning vehicle described above, the suspension plate includes the first plate and the second plate each having a dimension in the vehicle front-rear direction and a dimension in the vehicle up-down direction larger than the dimension thereof in the vehicle left-right direction. This ensures the rigidity of the suspension plate in the pitch direction. Since the first plate and the second plate are stacked together in the left-right direction, the bending rigidity of the suspension plate in the vehicle left-right direction is low as compared with a case where the suspension plate is formed from a single plate. Therefore, the integrity between the vehicle body frame and the drive source is relaxed when the vehicle body frame is tilted and when returning from the tilted position to the upright position during cornering. This smooths the behavioral change of the vehicle body frame in response to an operation by the rider, thus improving the riding feel during cornering. Moreover, with the leaning vehicle described above, the first plate and the second plate are in slidable contact with each other. Therefore, friction occurs between the first plate and the second plate when the vehicle body frame is tilted and when returning from the tilted position to the upright position during cornering. This also smooths the behavioral change of the vehicle body frame in response to an operation by the rider. Therefore, it is possible to further improve the riding feel during cornering.

The first plate and the second plate may be coupled together by a bolt or a rivet.

Thus, the first plate and the second plate can be coupled to each other by a simple configuration and can be brought into slidable contact with each other.

The frame member, the first plate and the second plate may be coupled together by a bolt or a rivet.

Thus, the same member can be used as the member for coupling together the suspension plate and the frame member and as the member for coupling together the first plate and the second plate. Thus, it is possible to reduce the number of parts. The first plate, the second plate and the frame member can be coupled together by a simple configuration, and the first plate and the second plate can be brought into slidable contact with each other.

A material of the first plate and a material of the second plate may be different from each other.

Thus, it is possible to adjust the characteristics of the suspension plate by suitably using different materials for the first plate and for the second plate.

The suspension plate may be arranged outward relative to the frame member in a vehicle width direction.

Thus, the suspension plate can be attached to the vehicle body frame from the outside in the vehicle width direction.

The frame member may have a first attachment hole and a second attachment hole that are open sideward. The drive source may be a third attachment hole that is open sideward. The first plate and the second plate may each have a first through hole, a second through hole and a third through hole that each run through in a left-right direction. The leaning vehicle may include a first bolt that is inserted through the first through hole of the first plate, the first through hole of the second plate and the first attachment hole of the frame member for fixing the first plate and the second plate to the frame member. The leaning vehicle may include a second bolt that is inserted through the second through hole of the first plate, the second through hole of the second plate and the second attachment hole of the frame member for fixing the first plate and the second plate to the frame member. The leaning vehicle may include a third bolt that is inserted through the third through hole of the first plate, the third through hole of the second plate and the third attachment hole of the drive source for fixing the drive source to the first plate and the second plate.

The drive source can be easily assembled to the frame member while realizing the effects described above.

As the vehicle is viewed from the side, a first straight line denotes a straight line that connects together a center of the first through hole and a center of the second through hole, a second straight line denotes a straight line that connects together the center of the second through hole and a center of the third through hole, a third straight line denotes a straight line that connects together the center of the third through hole and the center of the first through hole, and a plate center denotes a center of gravity of a triangle that connects together the center of the first through hole, the center of the second through hole and the center of the third through hole. As the vehicle is viewed from the side, the first plate and the second plate each have: a first side that is located on the opposite side of the first straight line from the plate center and is curved in a concave shape protruding toward the first straight line; a second side that is located on the opposite side of the second straight line from the plate center and is curved in a concave shape protruding toward the second straight line; and a third side that is located on the opposite side of the third straight line from the plate center and is curved in a concave shape protruding toward the third straight line.

Thus, the first plate and the second plate can be made lighter in weight.

The drive source may be an internal combustion engine including a crankshaft extending in the vehicle left-right direction. The suspension plate may be arranged forward relative to the crankshaft in the vehicle front-rear direction, as the vehicle is viewed from the side. The suspension plate may be arranged upward relative to the crankshaft in the vehicle up-down direction, as the vehicle is viewed from the side.

The vehicle body frame may include a main frame extending rearward from the head pipe, a down frame extending downward from the head pipe, and a lower frame extending rearward from a lower end portion of the down frame. The frame member may be the main frame, the down frame or the lower frame.

According to the present invention, it is possible to provide a leaning vehicle in which the drive source is stably supported on the vehicle body frame and a good riding feel is obtained.

DETAILED DESCRIPTION OF THE PREFERRED EMBODIMENTS

Figure 1:
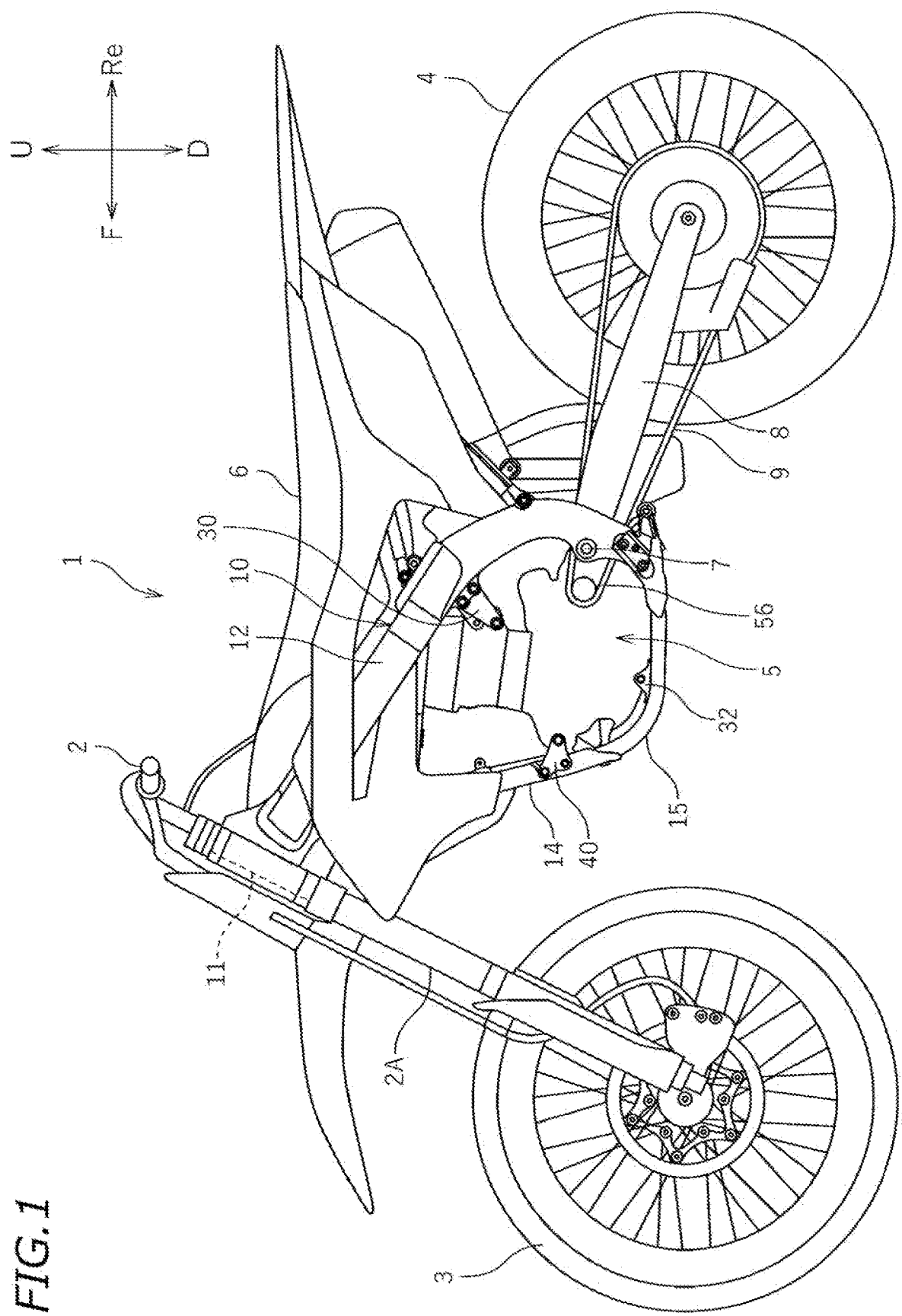
FIG. 1 is a left side view showing a motorcycle according to an embodiment.

One embodiment of a leaning vehicle will now be described. As shown in FIG. 1, an embodiment of a leaning vehicle to be described blow is an off-road-type motorcycle 1.

The terms front, rear, left, right, up and down, as used in the description below, refer to these directions as viewed from a virtual rider seated on a seat 6 while the motorcycle 1 is standing upright on a horizontal surface with no rider and no load thereon, unless specified otherwise. The designations F, Re, L, R, U and D, as used in the figures, refer to front, rear, left, right, up and down, respectively.

The motorcycle 1 includes a vehicle body frame 10 having a head pipe 11, a handle 2, a front wheel 3, a rear wheel 4, a seat 6 supported on the vehicle body frame 10, and an internal combustion engine (hereinafter referred to as the "engine") 5 supported on the vehicle body frame 10.

A steering shaft (not shown) is inserted in the head pipe 11 so that the steering shaft can rotate left and right. The handle 2 is connected to an upper portion of the steering shaft. A front fork 2A is connected to a lower portion of the steering shaft. The front wheel 3 is connected to a lower end portion of the front fork 2A. A pivot shaft 7 is connected to the vehicle body frame 10. The pivot shaft 7 is connected to a rear arm 8. The rear arm 8 is supported on the vehicle body frame 10 via the pivot shaft 7 so that the rear arm 8 can pivot up and down. The rear wheel 4 is connected to a rear end portion of the rear arm 8. The rear wheel 4 is connected to the engine 5 via a chain 9. The chain 9 is a power transmission member that transmits the driving force of the engine 5 to the rear wheel 4. Note however that the power transmission member is not limited to the chain 9, but may be a transmission belt, a drive shaft, etc. The rear wheel 4 is the drive wheel driven by the engine 5.

Figure 2:
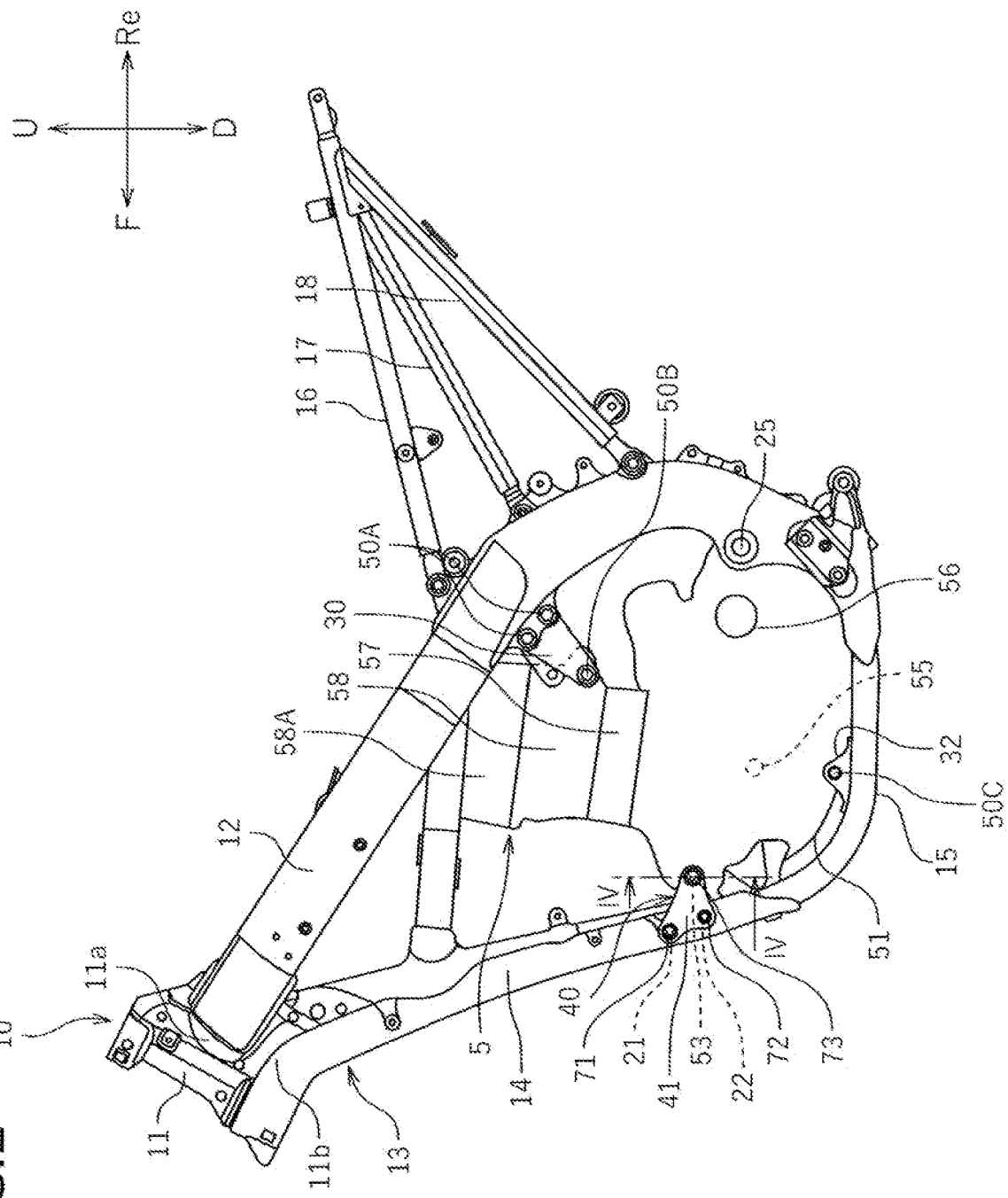
FIG. 2 is a left side view showing a vehicle body frame and an internal combustion engine.
Figure 3:
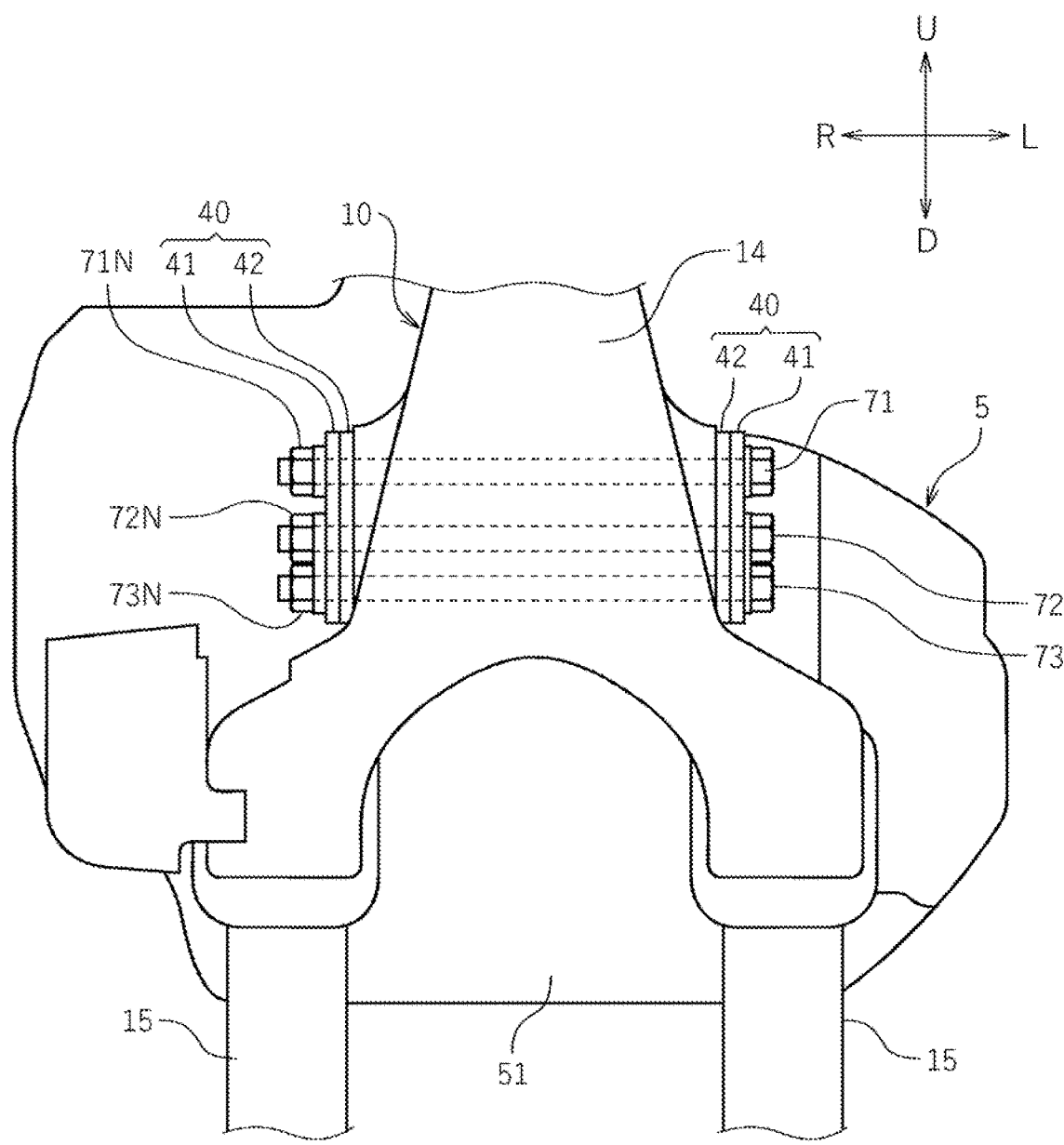
FIG. 3 is a partial front view showing the vehicle body frame and the internal combustion engine.

FIG. 2 is a left side view showing the vehicle body frame 10 and the engine 5. FIG. 3 is a partial front view showing the vehicle body frame 10 and the engine 5. As shown in FIG. 2, the vehicle body frame 10 includes the head pipe 11, left and right main frames 12 extending rearward from the head pipe 11, a down frame 14 extending downward from the head pipe 11, left and right lower frames 15 extending rearward from the lower end of the down frame 14, left and right seat frames 16 extending rearward and upward from the main frame 12, and other frames 17, 18 extending rearward and upward from the main frame 12. The main frame 12 extends rearward and downward from a first portion 11a of the head pipe 11. The down frame 14 extends rearward and downward from a second portion 11b, which is downward relative to the first portion 11a of the head pipe 11. The rear end portion of the lower frame 15 and the lower end portion of the main frame 12 are connected together. The frame 17 is arranged downward of the seat frame 16, and the frame 18 is arranged downward of the frame 17.

The main frame 12 has a hole 25 formed therein, through which the pivot shaft 7 is inserted. The pivot shaft 7 is supported on the main frame 12. The down frame 14 has attachment holes 21, 22 formed therein, through which bolts 71, 72 are inserted for attaching suspension plates 40 to be described below. The attachment holes 21, 22 are open sideward. The attachment holes 21, 22 are open leftward and rightward.

The engine 5 includes a crankshaft 55, an output shaft 56, a crankcase 51 that supports the crankshaft 55, a cylinder body 57 extending upward from the crankcase 51, a cylinder head 58 extending upward from the cylinder body 57, and a cylinder head cover 58A extending upward from the cylinder head 58. In the present embodiment, the cylinder body 57 extends upward and rearward. However, there is no particular limitation thereto, the cylinder body 57 may extend upward along the vertical line or may extend upward and forward. The crankshaft 55 extends in the vehicle left-right direction. The chain 9 (see FIG. 1) is wound around the output shaft 56 via a sprocket (not shown).

A bracket 30 is fixed to the main frame 12. The bracket 30 may be welded to the main frame 12, but it is herein fixed to the main frame 12 by a bolt 50A. The cylinder head 58 of the engine 5 is fixed to the bracket 30 by a bolt 50B.

A bracket 32 is fixed to the lower frame 15. While the bracket 32 may be fixed to the lower frame 15 by a bolt, it is herein welded to the lower frame 15. A lower portion of the crankcase 51 of the engine 5 is fixed to the bracket 32 by a bolt 50C.

Figure 4:
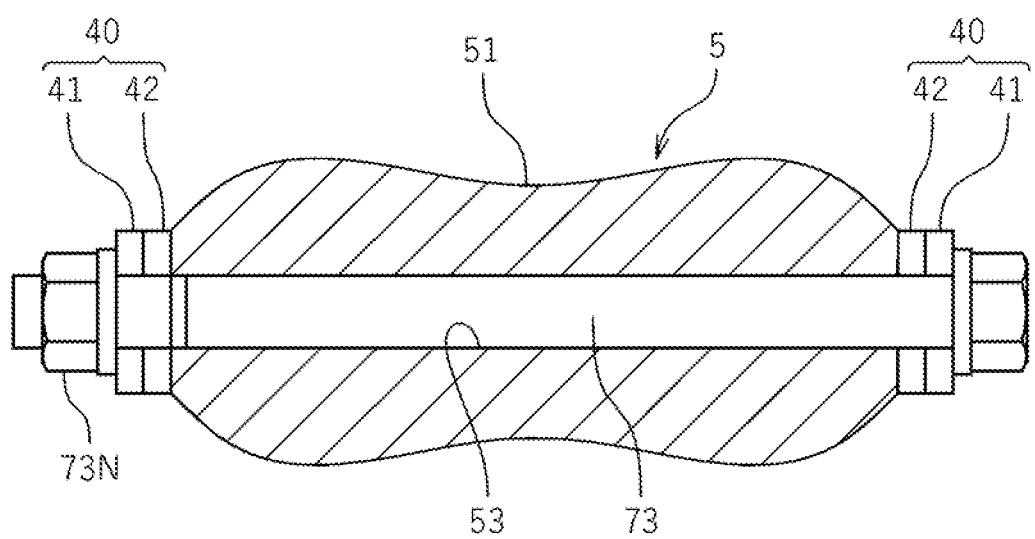
FIG. 4 is a cross-sectional view taken along line IV-IV of FIG. 2.

Left and right suspension plates 40 are fixed to the down frame 14. The left and right suspension plates 40 are fixed to the down frame 14 by the bolts 71, 72 and nuts 71N, 72N (see FIG. 3). FIG. 4 is a cross-sectional view taken along line IV-IV of FIG. 2. An attachment hole 53 is formed in the crankcase 51 of the engine 5. The attachment hole 53 is open sideward. The crankcase 51 is fixed to the left and right suspension plates 40 by a bolt 73 inserted through the attachment hole 53 and a nut 73N.

Next, the details of a suspension plate 40 will be described.

Figure 5:
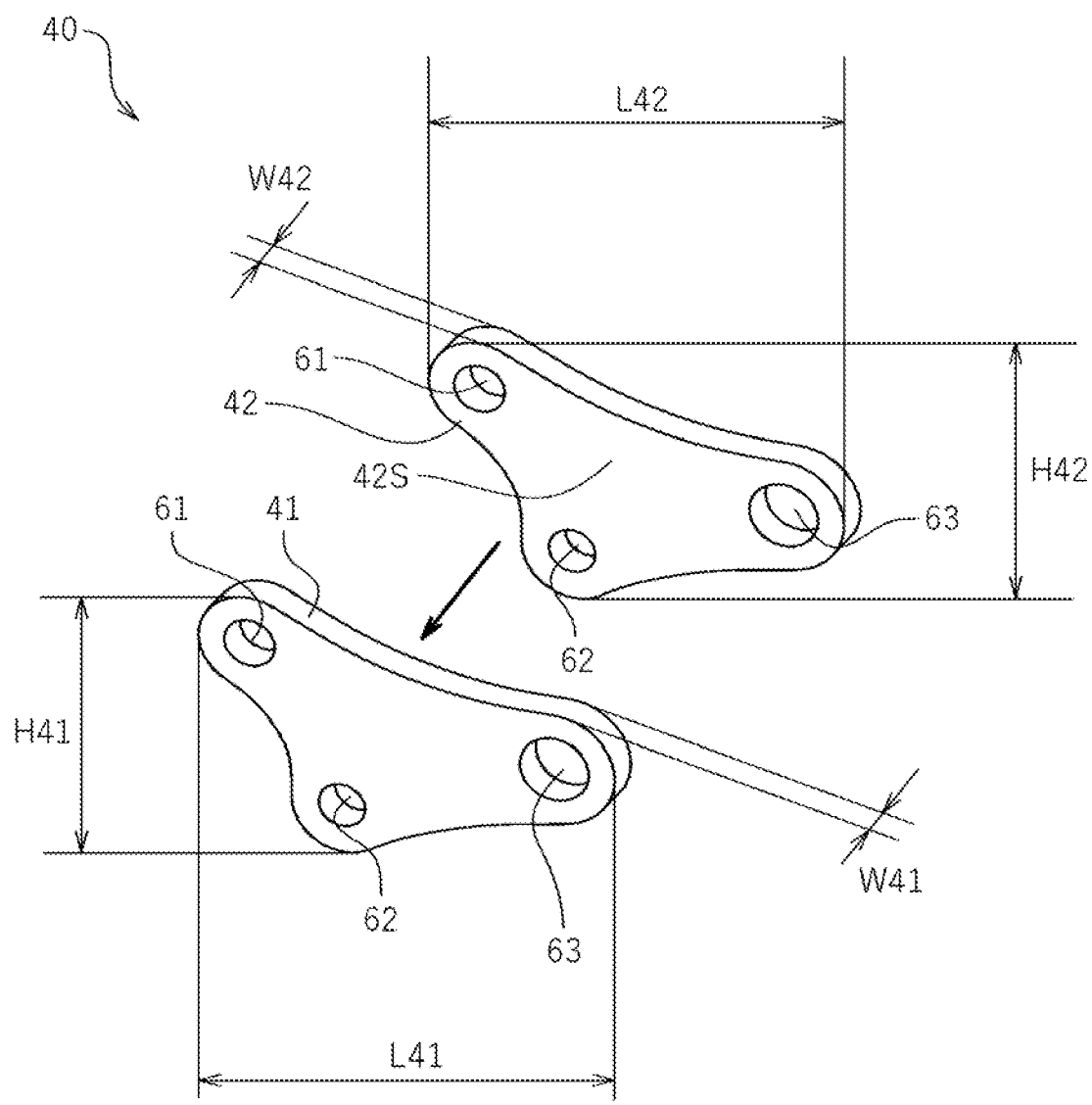
FIG. 5 is an exploded perspective view showing a suspension plate.

As shown in FIG. 5, the suspension plate 40 includes a first plate 41 and a second plate 42. While the suspension plate 40 may be composed of three or more plates, it is herein composed of two plates 41, 42. While the shapes or dimensions of the first plate 41 and the second plate 42 may differ from each other, the shapes and dimensions of the first plate 41 and the second plate 42 are herein equal to each other. While the materials of the first plate 41 the second plate 42 may differ from each other, they are herein equal to each other. The dimension W41 of the first plate 41 in the vehicle left-right direction is smaller than the dimension L41 of the first plate 41 in the vehicle front-back direction and smaller than the dimension H41 in the vehicle up-down direction. The dimension W42 of the second plate 42 in the vehicle left-right direction is smaller than the dimension L42 of the second plate 42 in the vehicle front-rear direction and smaller than the dimension H42 in the vehicle up-down direction.

Figure 6:
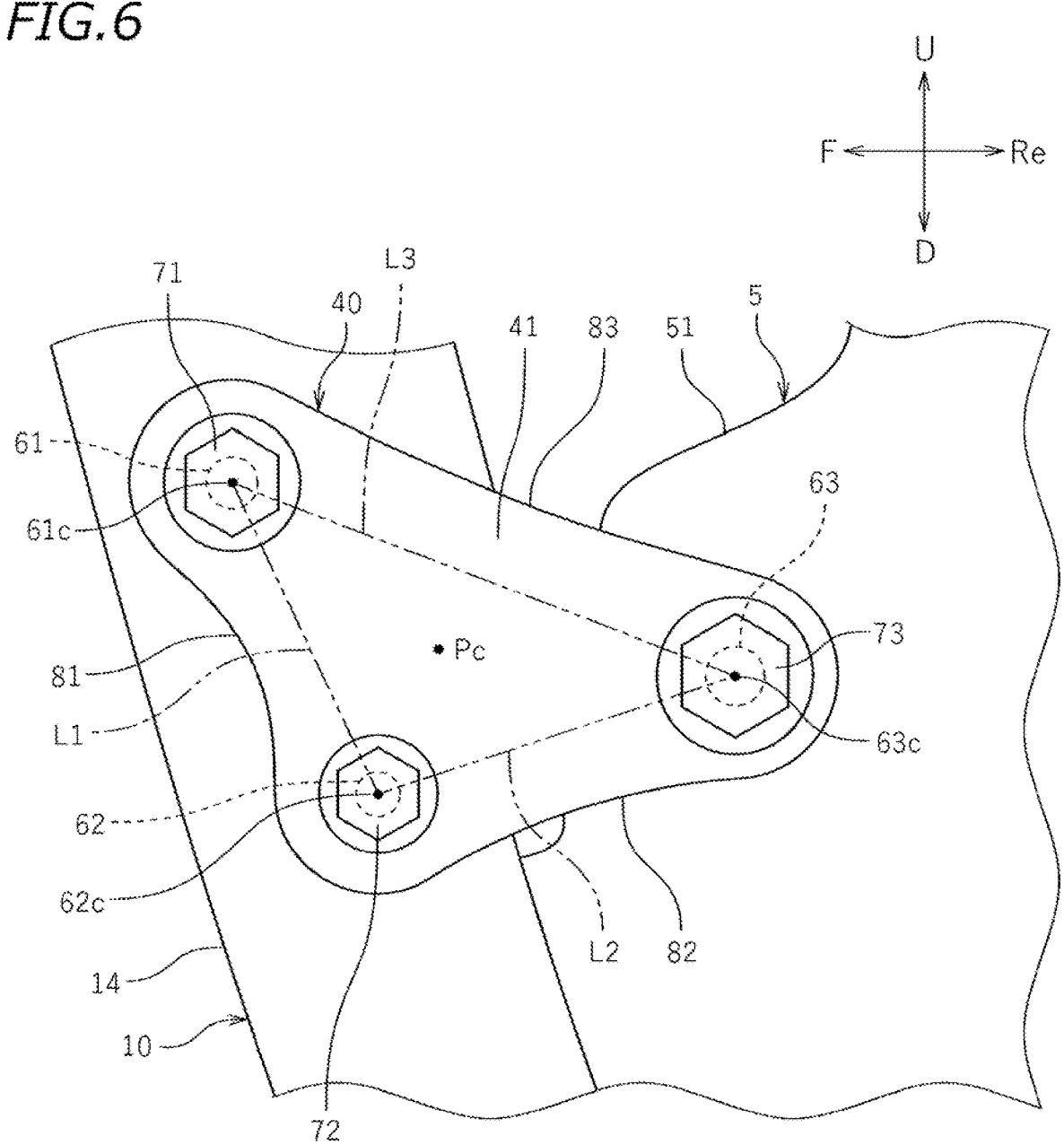
FIG. 6 is a side view of the suspension plate.

The first plate 41 has a first through hole 61, a second through hole 62 and a third through hole 63 formed therein, which pass through in the vehicle left-right direction. As shown in FIG. 6, the first plate 41 is formed in a generally triangular shape as the vehicle is viewed from the side. Note however that each side of the first plate 41 is curved in a concave shape. This will be described in detail below.

As shown in FIG. 6, as the vehicle is viewed from the side, the first straight line L1 denotes a straight line that connects together the center 61c of the first through hole 61 and the center 62c of the second through hole 62, the second straight line L2 denotes a straight line that connects together the center 62c of the second through hole 62 and the center 63c of the third through hole 63, the third straight line L3 denotes a straight line that connects together the center 63c of the third through hole 63 and the center 61c of the first through hole 61, and the plate center Pc denotes the center of gravity of the triangle that connects together the center 61c of the first through hole 61, the center 62c of the second through hole 62 and the center 63c of the third through hole 63. Note that the center of gravity of a triangle as used herein is the center of gravity of a triangle as defined in geometry. That is, in a triangle, three lines (midlines) are formed each connecting a vertex and the midpoint of its opposite side, and the center of gravity of the triangle is the point where these three midlines intersect. As the vehicle is viewed from the side, the first plate 41 has a first side 81, a second side 82 and a third side 83. The first side 81 is located on the opposite side of the first straight line L1 from the plate center Pc, and is curved in a concave shape protruding toward the first straight line L1. The second side 82 is located on the opposite side of the second straight line L2 from the plate center Pc, and is curved in a concave shape protruding toward the second straight line L2. The third side 83 is located on the opposite side of the third straight line L3 from the plate center Pc, and is curved in a concave shape protruding toward the third straight line L3.

As described above, the shape of the second plate 42 is equal to the shape of the first plate 41. Therefore, the shape of the second plate 42 will not be described below while like portions to those of the first plate 41 are denoted by like reference signs.

As shown in FIG. 5, the first plate 41 and the second plate 42 are stacked together in the vehicle left-right direction. The first plate 41 and the second plate 42 are coupled together by the bolts 71 to 73 but are not welded together. The entire opposing surfaces of the first plate 41 and the second plate 42 are not welded together, and the first plate 41 and the second plate 42 are also not spot welded together. The first plate 41 and the second plate 42 are in slidable contact with each other. Note that sliding between the first plate 41 and the second plate 42 is so minute that it cannot easily be perceived visually. When the first plate 41 and the second plate 42 slide against each other, the suspension plate 40 does not undergo any significant deformation that can be visually perceived. The contact surface of the second plate 42 with the first plate 41 may be the entirety or a part of the opposing surface 42S of the second plate 42 facing the first plate 41. There is no particular limitation on the contact area of the second plate 42 with the first plate 41.

There is no particular limitation on the configuration of coupling the first plate 41 and the second plate 42 so that they can slide against each other. For example, the first plate 41 and the second plate 42 may be coupled together by a rivet. In the present embodiment, the first plate 41 and the second plate 42 are coupled together by the bolts 71, 72 for fixing the suspension plate 40 to the vehicle body frame 10 and the bolt 73 for fixing the engine 5 to the suspension plate 40.

Specifically, as shown in FIG. 2, the bolt 71 is inserted through the first through hole 61 of the first plate 41, the first through hole 61 of the second plate 42 and the attachment hole 21 of the down frame 14. The bolt 71 and the nut 71N (see FIG. 3) couple together the first plate 41 and the second plate 42 so that they can slide against each other, and fix the first plate 41 and the second plate 42 to the down frame 14.

The bolt 72 is inserted through the second through hole 62 of the first plate 41, the second through hole 62 of the second plate 42 and the attachment hole 22 of the down frame 14. The bolt 72 and the nut 72N couple together the first plate 41 and the second plate 42 so that they can slide against each other, and fix the first plate 41 and the second plate 42 to the down frame 14.

The bolt 73 is inserted through the third through hole 63 of the first plate 41, the third through hole 63 of the second plate 42 and the attachment hole 53 of the engine 5. The bolt 73 and the nut 73N couple together the first plate 41 and the second plate 42 so that they can slide against each other, and fix the engine 5 to the first plate 41 and the second plate 42.

In the present embodiment, the suspension plates 40 are arranged outward relative to the down frame 14 in the vehicle width direction. Specifically, the left suspension plate 40 is arranged leftward of the down frame 14, and the right suspension plate 40 is arranged rightward of the down frame 14.

In the present embodiment, as the vehicle is viewed from the side, the suspension plates 40 are arranged forward in the vehicle front-rear direction relative to the crankshaft 55. As the vehicle is viewed from the side, the suspension plates 40 are arranged upward in the vehicle up-down direction relative to the crankshaft 55. Note however that there is no particular limitation on the position of the suspension plates 40. The area of the vehicle body frame 10 where the suspension plates 40 can be attached is not limited to the down frame 14. The suspension plates 40 may be attached to the main frame 12 or the lower frame 15.

The motorcycle 1 is configured as described above. Next, various effects to be realized by the motorcycle 1 according to the present embodiment will be described.

The engine 5, which is the drive source for traveling, is a heavy object. When the motorcycle 1 rapidly accelerates or rapidly decelerates, an inertial force is generated on the engine 5. Therefore, when the motorcycle 1 rapidly accelerates, the vehicle body frame 10 receives a rearward force from the engine 5. When the motorcycle 1 rapidly decelerates, the vehicle body frame 10 receives a forward force from the engine 5. The motorcycle 1 travels on uneven road surfaces. When the unevenness of the road surface is significant, the vehicle body frame 10 significantly moves upward or downward. When the vehicle body frame 10 moves upward, an inertial force is generated on the engine 5, and the vehicle body frame 10 receives a downward force from the engine 5. When the vehicle body frame 10 moves downward, an inertial force is generated on the engine 5, and the vehicle body frame 10 receives an upward force from the engine 5. Thus, the vehicle body frame 10 receives a forward, rearward, upward and downward force from the engine 5. Therefore, the suspension plates 40 that connect together the vehicle body frame 10 and the engine 5 are required to have a high rigidity in the pitch direction. The higher the rigidity of the suspension plates 40 in the pitch direction, the higher the integrity between the vehicle body frame 10 and the engine 5 for the pitch direction is and the more there is the sense of stability. Particularly with an off-road-type motorcycle 1 that travels on rough road surfaces, it is possible to realize a good stability.

On the other hand, since the motorcycle 1 is a leaning vehicle, the vehicle body frame 10 is tilted leftward or rightward when turning left or right. When the motorcycle 1 travels straight after turning left or right, the vehicle body frame 10 is returned from the tilted position to the upright position. Since an inertial force is generated on the engine 5, the vehicle body frame 10 receives a leftward force or a rightward force from the engine 5 during cornering. However, the action of tilting and the action of raising the vehicle body frame 10 during cornering are performed by the rider. If the integrity between the vehicle body frame 10 and the engine 5 is too high, it is difficult for the rider to easily perform the action of tilting and the action of raising the vehicle body frame 10. In order to increase the stability of the engine 5, it is preferred to securely fix the engine 5 to the vehicle body frame 10. However, simply securely fixing the engine 5 to the vehicle body frame 10 will cause the rider to feel a stiff feel during cornering, thereby lowering the riding feel.

Figure 7A:
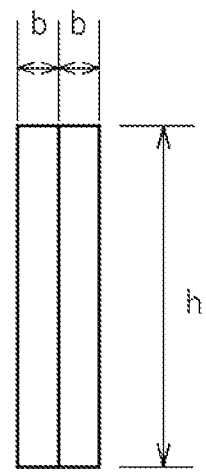
FIG. 7a is a view showing a plate formed by stacking two plates together in the left-right direction.
Figure 7B:
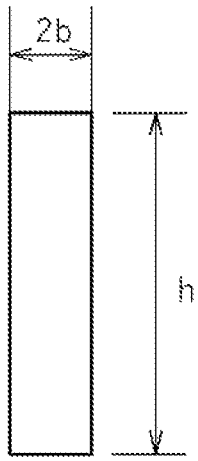
FIG. 7b is a view showing a single plate.

Now, the cross-sectional secondary moment I1 about the vertical axis of a plate whose dimension in the left-right direction is b and whose dimension in the up-down direction is h is $I1=(1/12)hb^3$. Therefore, as shown in FIG. 7a, when two plates whose dimension in the left-right direction is b and whose dimension in the up-down direction is h are stacked together in the left-right direction, the cross-sectional secondary moment about the vertical axis is $2 \times I1 = (1/6)hb^3$. On the other hand, as shown in FIG. 7b, the cross-sectional secondary moment I2 about the vertical axis of a plate whose dimension in the left-right direction is 2b and whose dimension in the up-down direction is h is $I2=h(2b)^3/12=(3/4)hb^3$. Therefore, $2 \times I1 < I2$. With the dimension in the left-right direction being equal, a plate including two plates stacked together in the left-right direction (see FIG. 7a) has a smaller cross-sectional secondary moment about the vertical axis than a single plate (see FIG. 7b).

According to the present embodiment, each of the suspension plates 40 that connect together the engine 5 and the vehicle body frame 10 is not a single plate but is composed of the first plate 41 and the second plate 42 stacked together in the left-right direction. Therefore, as compared with a case where each suspension plate 40 is composed of a single plate, the rigidity against bending in the left-right direction is reduced while ensuring the same rigidity in the pitch direction. Regarding the behavior in the left-right direction of the vehicle body frame 10 and the engine 5, the integrity between the vehicle body frame 10 and the engine 5 is relaxed. This allows the rider to more easily perform the action of tilting and the action of raising the vehicle body frame 10 during cornering.

In addition, according to the present embodiment, the first plate 41 and the second plate 42 are in slidable contact with each other. The first plate 41 and the second plate 42 are not welded to each other. When the rider performs the action of tilting and the action of raising the vehicle body frame 10, the suspension plates 40 receive a force in the left-right direction from the vehicle body frame 10 and the engine 5. Therefore, a bending moment acts on the suspension plates 40, and the suspension plates 40 temporarily undergo a minute elastic deformation. In other words, the suspension plates 40 temporarily bend in the left-right direction and then recover. In the present embodiment, since the first plate 41 and the second plate 42 are in slidable contact with each other, when the bending moment in the left-right direction is applied to the suspension plates 40, a friction is generated between the first plate 41 and the second plate 42. This friction causes energy loss, resulting in hysteresis in the elastic deformation of the suspension plates 40. This can enhance the ability to absorb behavioral changes for the behavior of the vehicle body frame 10 and the engine 5 in the left-right direction. The rider can perform the action of tilting and the action of raising the vehicle body frame 10 in a well-connected manner.

Thus, according to the present embodiment, a sufficient sense of stability can be obtained even when traveling on road surfaces with significant unevenness, and it is possible to easily perform the action of tilting and the action of raising the vehicle body frame 10 during cornering. Thus, the rider can obtain a good riding feel.

According to the present embodiment, the first plate 41 and the second plate 42 are coupled together by the bolts 71 to 73. According to the present embodiment, the first plate 41 and the second plate 42 can be coupled to each other by a simple configuration and can be brought into slidable contact with each other.

The bolts for coupling together the first plate 41 and the second plate 42 and the bolts for coupling the suspension plates 40 to the vehicle body frame 10 may be different from each other. However, in the present embodiment, the vehicle body frame 10, the first plate 41 and the second plate 42 are coupled together by the same bolts 71 to 73. Therefore, the number of parts can be reduced. The first plate 41, the second plate 42 and the vehicle body frame 10 can be coupled to each other by a simple configuration, and the first plate 41 and the second plate 42 can be brought into slidable contact with each other.

In the present embodiment, the material of the first plate 41 and the material of the second plate 42 are equal to each other. However, the material of the first plate 41 and the material of the second plate 42 may be different from each other. For example, the material of one of the first plate 41 and the second plate 42 may be iron and the other may be aluminum. By suitably using different materials for the first plate 41 and for the second plate 42, it is possible to adjust the characteristics of the suspension plates 40 (e.g., the rigidity in the pitch direction, the rigidity against bending in the left-right direction, the hysteresis characteristics, etc.).

Note that in the present embodiment, the dimension W41 of the first plate 41 in the left-right direction and the dimension W42 of the second plate 42 in the left-right direction are equal, but they may be different from each other. The characteristics of the suspension plates 40 can be adjusted also by suitably using different dimensions for the dimension W41 of the first plate 41 in the left-right direction and for the dimension W42 of the second plate 42 in the left-right direction.

According to the present embodiment, the suspension plates 40 are arranged outward relative to the vehicle body frame 10 in the vehicle width direction. Therefore, the suspension plates 40 can be attached to the vehicle body frame 10 from the outside in the vehicle width direction. Note that outward in the vehicle width direction refers to the direction away from the vehicle center line for the vehicle left-right direction. Inward in the vehicle width direction refers to the direction toward the vehicle center line for the vehicle left-right direction.

According to the present embodiment, the first plate 41 and the second plate 42 each have three through holes. That is, the first through hole 61, the second through hole 62 and the third through hole 63 are formed in the first plate 41 and the second plate 42. The suspension plates 40 are fixed to the vehicle body frame 10 by the bolt 71 inserted through the first through hole 61 and the bolt 72 inserted through the second through hole 62. The engine 5 is fixed to the suspension plates 40 by the bolt 73 inserted through the third through hole 63. According to the present embodiment, the engine 5 can be easily assembled to the vehicle body frame 10 while realizing the effects described above.

According to the present embodiment, as the vehicle is viewed from the side the first to third sides 81 to 83 of the first plate 41 and the second plate 42 are formed in a concave shape protruding toward the plate center Pc. Therefore, the first plate 41 and the second plate 42 can be made lighter in weight while realizing the effects described above. The suspension plates 40 can be made lighter while realizing the effects described above.

While one embodiment has been described above, the embodiment is merely an example. Various other embodiments are possible.

Figure 8:
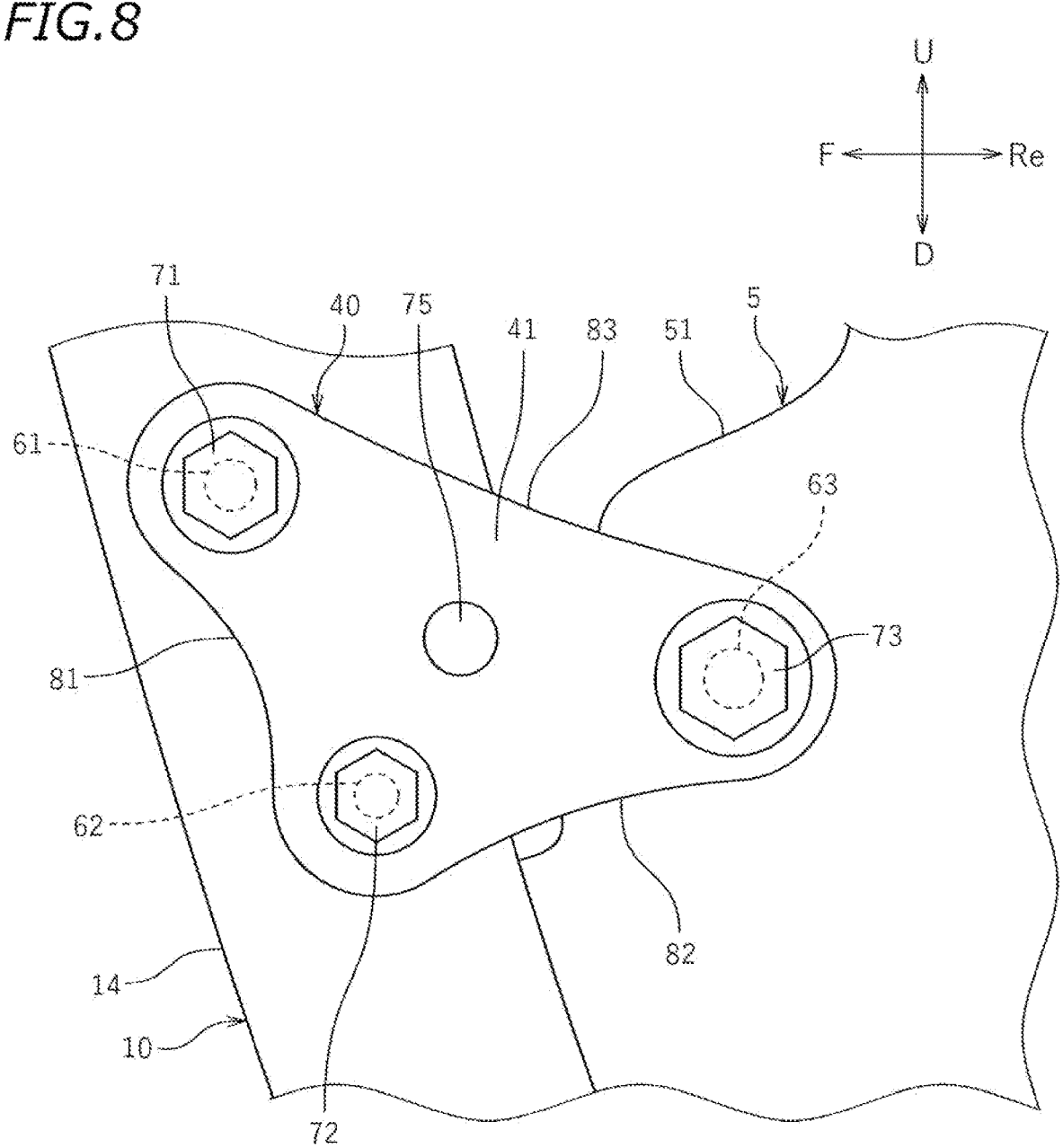
FIG. 8 is a side view showing a suspension plate including a first plate and a second plate that are coupled together by a rivet.

The coupling members for coupling together the first plate 41 and the second plate 42 so that they are slidable against each other are not limited to bolts. For example, as shown in FIG. 8, the first plate 41 and the second plate 42 may be coupled together by a rivet 75. By coupling together the first plate 41 and the second plate 42 by the rivet 75 in addition to the bolts 71 to 73, it is possible to increase the adhesion force between the first plate 41 and the second plate 42. Note that the number of rivets 75 is not limited to one, but it may be two or more.

While the suspension plates 40 are provided on the left side and on the right side of the vehicle body frame 10 in the embodiment described above, but the suspension plates 40 may be provided only on the left side or may be provided only on the right side. The number of suspension plates 40 is not limited to two, but may be one or may be three or more. Three or more locations of the engine 5 may be fixed to the suspension plates 40.

The number of through holes in the first plate 41 and the second plate 42 are not limited to three. The number of through holes may be two or may be four or more.

At least one of the first to third sides 81 to 83 of the first plate 41 and the second plate 42 may not be formed in a concave shape protruding toward the plate center Pc, as the vehicle is viewed from the side.

The suspension plates 40 do not always need to be arranged outward relative to the vehicle body frame 10 in the vehicle width direction. The suspension plates 40 may be arranged inward relative to the vehicle body frame 10 in the vehicle width direction.

The suspension plates 40 do not need to be arranged forward relative to the crankshaft 55 in the vehicle front-rear direction, as the vehicle is viewed from the side. The suspension plates 40 may be arranged rearward relative to the crankshaft 55 in the vehicle front-rear direction, as the vehicle is viewed from the side.

The suspension plates 40 do not need to be arranged upward relative to the crankshaft 55 in the vehicle up-down direction, as the vehicle is viewed from the side. The suspension plates 40 may be arranged downward relative to the crankshaft 55 in the vehicle up-down direction, as the vehicle is viewed from the side.

The configuration of the vehicle body frame 10 in the embodiment described above is merely an example. There is no particular limitation on the configuration of the vehicle body frame 10.

The leaning vehicle is not limited to an off-road-type motorcycle, but may be an on-road-type motorcycle. The leaning vehicle is not limited to a motorcycle, but may be an auto tricycle, or the like. The drive source attached to the suspension plates 40 is not limited to the engine 5, but may be an electric motor, or the like. The leaning vehicle may be an electric vehicle.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A leaning vehicle comprising:
   a body frame, including
      a head pipe, and
      a frame member extending rearward from the head pipe;
   a suspension plate attached to the frame member; and
   a drive source attached to the suspension plate, wherein:
   the suspension plate includes a first plate and a second plate stacked together in a left-right direction of the leaning vehicle, wherein
      a dimension of the first plate in the left-right direction is smaller than a dimension thereof in a front-rear direction of the leaning vehicle and a dimension thereof in an up-down direction of the leaning vehicle, and
      a dimension of the second plate in the left-right direction is smaller than a dimension thereof in the front-rear direction and a dimension thereof in the up-down direction;
   the first plate and the second plate are in slidable contact with each other; and
   the first plate and the second plate are coupled together by a bolt or a rivet.

2. The leaning vehicle according to claim 1, wherein the frame member, the first plate and the second plate are coupled together by the bolt or the rivet.

3. The leaning vehicle according to claim 1, wherein a material of the first plate and a material of the second plate are different from each other.

4. The leaning vehicle according to claim 1, wherein the suspension plate is arranged further outward than the frame member in a width direction of the leaning vehicle.

5. The leaning vehicle according to claim 1, wherein:
   the frame member has a first attachment hole and a second attachment hole formed therein, the first attachment hole and the second attachment hole being open sideward;
   the drive source has a third attachment hole formed therein that is open sideward;
   each of the first plate and the second plate has a first through hole, a second through hole, and a third through hole form therein, the first, second and third through holes each running through in the left-right direction of the leaning vehicle; and
   the first plate and the second plate are coupled together by the bolt, which is a first bolt, and the leaning vehicle further includes a second bolt and a third bolt, wherein
      the first bolt is inserted through the first through hole of the first plate, the first through hole of the second plate, and the first attachment hole of the frame member, to thereby fix the first plate and the second plate to the frame member;
      the second bolt is inserted through the second through hole of the first plate, the second through hole of the second plate, and the second attachment hole of the frame member, to thereby fix the first plate and the second plate to the frame member; and
      the third bolt is inserted through the third through hole of the first plate, the third through hole of the second plate, and the third attachment hole of the drive source, to thereby fix the drive source to the first plate and the second plate.

6. The leaning vehicle according to claim 5, wherein:
   in a side view of the leaning vehicle, the leaning vehicle has
      a first straight line that is a straight line connecting a center of the first through hole and a center of the second through hole,
      a second straight line that is a straight line connecting the center of the second through hole and a center of the third through hole,
      a third straight line that is a straight line connecting the center of the third through hole and the center of the first through hole, and
      a plate center that is a center of gravity of a triangle that connects the center of the first through hole, the center of the second through hole, and the center of the third through hole; and
   in the side view of the leaning, each of the first plate and the second plate has:
      a first side that is located on the opposite side of the first straight line with respect to the plate center, and is curved concavely to protrude toward the first straight line;
      a second side that is located on the opposite side of the second straight line with respect to the plate center, and is curved concavely to protrude toward the second straight line; and
      a third side that is located on the opposite side of the third straight line with respect to the plate center, and is curved concavely to protrude toward the third straight line.

7. The leaning vehicle according to claim 1, wherein:
   the body frame includes
      a main frame extending rearward from the head pipe,
      a down frame extending downward from the head pipe, and
      a lower frame extending rearward from a lower end portion of the down frame; and
   the frame member is the main frame, the down frame or the lower frame.

8. A leaning vehicle, comprising:
   a body frame, including
      a head pipe, and a frame member extending rearward from the head pipe;
a suspension plate attached to the frame member; and
a drive source attached to the suspension plate, wherein:
the suspension plate includes a first plate and a second plate stacked together in a left-right direction of the leaning vehicle, wherein
a dimension of the first plate in the left-right direction is smaller than a dimension thereof in a front-rear direction of the leaning vehicle and a dimension thereof in an up-down direction of the leaning vehicle, and
a dimension of the second plate in the left-right direction is smaller than a dimension thereof in the front-rear direction and a dimension thereof in the up-down direction;
the first plate and the second plate are in slidable contact with each other;
the drive source is an internal combustion engine including a crankshaft extending in the left-right direction of the leaning vehicle; and
the suspension plate is arranged further forward than the crankshaft in the front-rear direction of the leaning vehicle, in a side view of the leaning vehicle.

9. A leaning vehicle, comprising:
a body frame, including
a head pipe, and
a frame member extending rearward from the head pipe;
a suspension plate attached to the frame member; and
a drive source attached to the suspension plate, wherein:
the suspension plate includes a first plate and a second plate stacked together in a left-right direction of the leaning vehicle, wherein
a dimension of the first plate in the left-right direction is smaller than a dimension thereof in a front-rear direction of the leaning vehicle and a dimension thereof in an up-down direction of the leaning vehicle, and
a dimension of the second plate in the left-right direction is smaller than a dimension thereof in the front-rear direction and a dimension thereof in the up-down direction;
the first plate and the second plate are in slidable contact with each other;
the drive source is an internal combustion engine including a crankshaft extending in the left-right direction of the leaning vehicle; and
the suspension plate is arranged further upward than the crankshaft in the up-down direction of the leaning vehicle, in a side view of the leaning vehicle.

* * * * *